Feb. 11, 1964  M. F. SMITH  3,120,757
METHOD AND MEANS FOR DETERMINING THE LEVEL
OF A LIQUID IN A CONTAINER
Filed Oct. 4, 1961                                    2 Sheets-Sheet 2

INVENTOR.
MILLARD F. SMITH
BY
BLAIR AND BUCKLES
ATTORNEYS.

3,120,757
METHOD AND MEANS FOR DETERMINING THE LEVEL OF A LIQUID IN A CONTAINER
Millard F. Smith, Westport, Conn. (% Neirad Industries Inc., P.O. Box 295, Saugatuck, Conn.)
Filed Oct. 4, 1961, Ser. No. 142,927
7 Claims. (Cl. 73—295)

The invention relates to a method and means for determining the level of a liquid in a container having no visible level indicator.

It is one object of the invention to measure the level of a liquid in a container from a distance.

It is another object of the invention to measure the level of a liquid in a container with an apparatus having no physical mechanical or electrical connection with the container.

It is a further object of the invention to measure the several levels of liquid in various containers with one apparatus in fixed position remote from the containers.

It is another object of the invention to have an automatic record of the liquid levels in a number of containers for a period of time using an apparatus in fixed position remote from the containers and without mechanical or electrical connections between containers and apparatus.

The invention is based on the fact that a container such as a storage tank will absorb heat from the surroundings and there will almost always be a temperature differential inside the tank because the absorption of heat by the liquid covered area is different from the absorption of heat by the vapour area above the liquid. The inside temperature will be apparent outside the tank by the amount of heat conducted through the shell of the container so that temperature measurements at different heights of the tank will show where the liquid zone ends and the vapour zone ends and the vapour zone starts.

Likewise there will be a difference in the heat, i.e. infrared radiation emitted from the tank between the lower part in the liquid zone and the upper part in the vapour zone.

According to the invention, the method for determining the level of a liquid in a container having no visible level indicator consists in measuring the infrared radiation emitted from various points vertically of the container by means of an infrared radiation detector.

In order to obtain readily comparable values, according to a further aspect of the invention, a black vertical line of high infrared emissivity is arranged on the container interrupted at regular intervals by highly reflective transverse strips, so that by scanning the line with an infrared radiation detector the point where the emission of radiation changes is readily ascertainable in relation to the non-emissive transverse strips serving as a graduation along the height of the container.

According to yet another aspect of the invention, the scanning movement of the radiation detector may be effected by an automatic device which may comprise programmed driving means including a timer clock, a chart recorder being combined with the radiation detector to produce a record showing the temperature at each point along the height of the container. In order to obtain automatically a periodical record of the quantity of liquid in several containers, the radiation detector device may also comprise programmed driving means including a timer clock to move the detector arranged on a mounting table for horizontal and vertical adjustment, for scanning several containers successively in a predetermined cycle.

As it is possible that the containers undergo slight movements which might affect the proper focussing of the radiation detector by programmed driving means, a closed circuit television attachment may be used as a sighting device for adjusting the position of the radiation detector with regard to a particular container to be scanned.

In order that the invention may be more fully understood, reference will now be made to the accompanying drawing illustrating very schematically an example of the radiometer arrangement in relation to emissive strips on a number of oil tanks.

Figure 1:
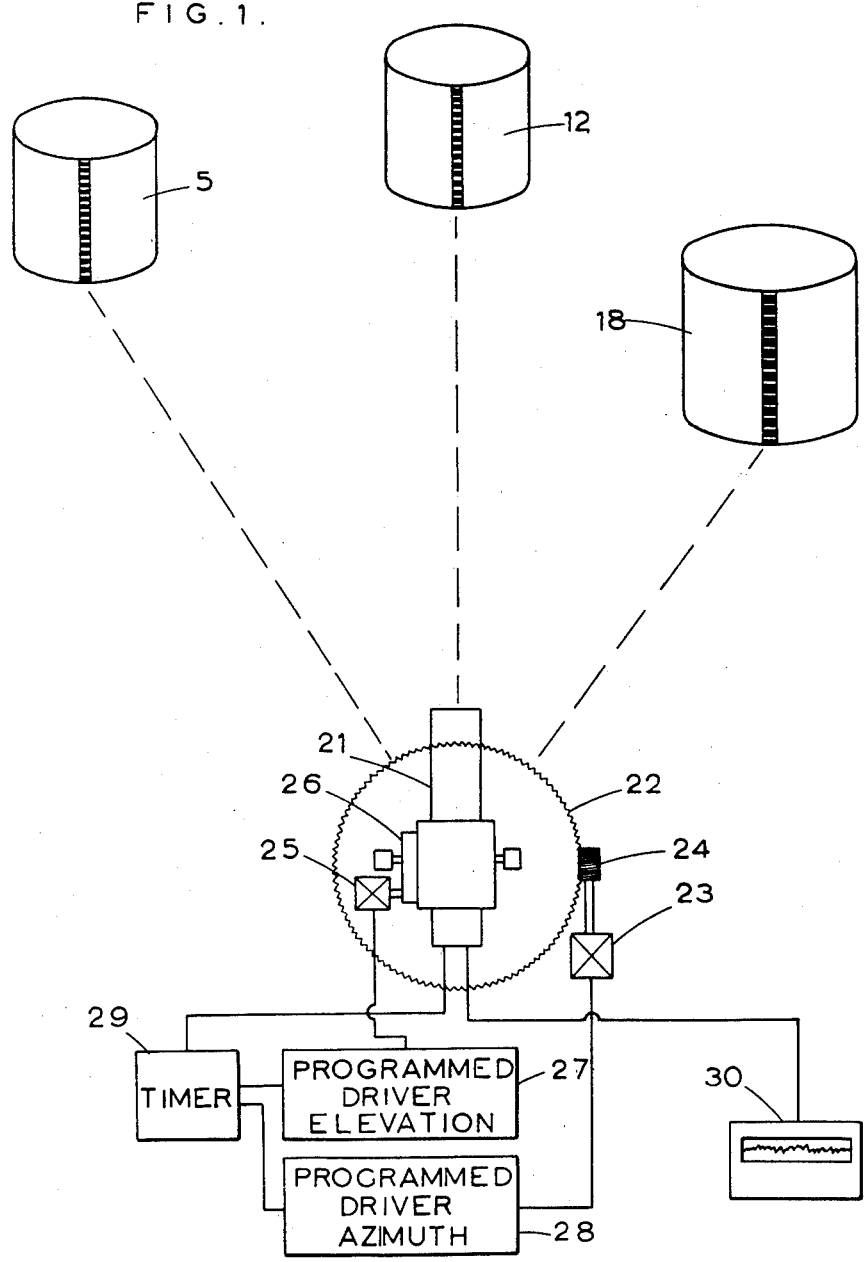
FIG. 1 shows diagrammatically the general arrangement of a radiating detector and of tanks.

Three storage tanks are represented in FIG. 1 numbered 5, 12 and 18, for instance, of a total of 20 tanks to be monitored by one radiation detector. An infrared radiation pyrometer head of standard design 21 is arranged on a gimbal mount table 22 which is rotatable by azimuth servo motor 23 through worm gear 24. Vertical adjustment of head 21 is effected by elevation servo motor 25 through pinion and toothed segment gear 26. The horizontal and vertical adjustment is automatically operated by programme devices 27 for elevation and 28 for azimuth in connection with the timer 29. The radiation pyrometer head 21 is further connected with a remote chart recorder 30.

Figure 2:
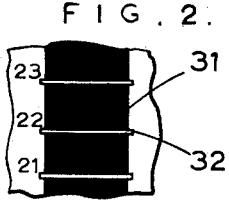
FIG. 2 shows part of an emissive strip in magnification.

The tanks are provided with vertical lines of black paint as indicated by 31 in FIG. 2 interrupted by horizontal reflective aluminium strips 32. The horizontal strips may be spaced, e.g. 12 inches apart and numbered to indicate the height or directly the contents of the tank at the height of a particular strip.

Figure 3:
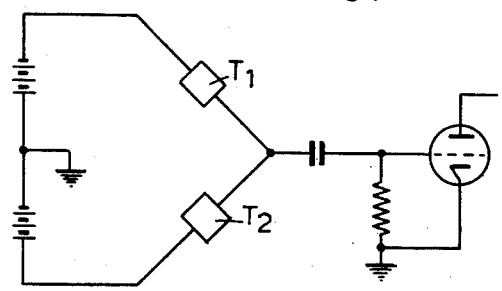
FIG. 3 is a typical circuit diagram.
Figure 4:
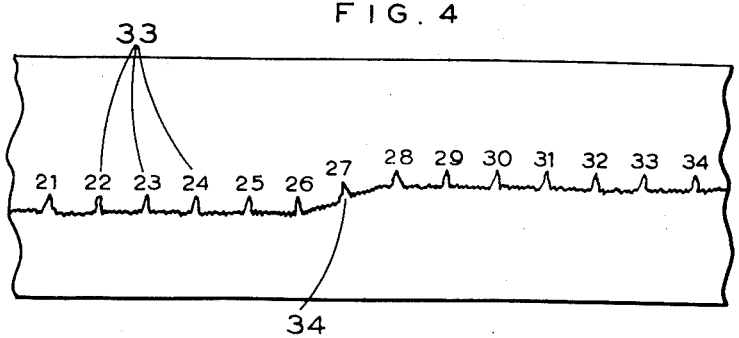
FIG. 4 is a typical chart recording.

When the radiation detector has been rotated by servo motor 23 controlled by programme device 28 to monitor as shown in FIG. 1 storage tank 12, programme device 27 will move head 21 through servo motor 25 to scan the black line on tank 12 and the chart recorder 30 will then produce a graph as shown in FIG. 4. Blips 33 will indicate the interruptions of the high emissivity of the block paint line at the points where the reflecting lines intersect the black line which when correspondingly markedly on the recording tape will directly show where the emissivity changes, i.e. where the temperature of the liquid zone changes into the temperature of the vapour zone thus giving the liquid level 34 or the liquid contents of the tank at the time of observation. A typical thermistor bolometer circuit is shown in FIG. 3. As a radiation detector using this type of circuit is commercially available it is thought sufficient to mention that the detector is operated in a bridge circuit as shown to reduce noise effects and microphonics when directly observing radiation changes.

I claim:
1. The method of determining the level of a liquid in a container comprising the steps of scanning the container of liquid with an infrared energy detector along a path substantially normal to the free surface of the liquid in the container, and recording the location of change in intensity of infrared energy emitted from the container at the free surface of the liquid while recording successive indicia representing liquid levels whereby a change in infrared radiation intensity from the container is recorded and the liquid level is ascertained by correlation of the indicia and the recorded radiation change.

2. The method of determining the level of a liquid in a plurality of containers comprising the steps of scanning each container of liquid with an infrared energy detector along a path substantially normal to the free surface of liquid in the container, recording the container location, and recording the location of change in intensity of infrared radiation emitted from the container at the free surface of the liquid while recording successive liquid level indicia for each container whereby a change in infrared radiation intensity from the container is recorded for each container and the liquid level is ascertained by correlation of the indicia and the recorded radiation change.

3. Apparatus for determining the level of a liquid in a container, said apparatus comprising, in combination, a radiator comprising portions positioned at different liquid levels and having different infrared radiating characteristics, said radiator being disposed in a close heat-exchange relation with the external surface of said container, an infrared detector positioned to receive the infrared energy emitted by each of said portions, and indicating means constructed to correlate the intensity of infrared energy radiated by each portion with the relative position of said portion on said container, whereby the portion adjacent said level is identified.

4. Apparatus for determining the level of liquid in an exposed container, said apparatus comprising, in combination, a heat radiator disposed on the external surface of said container, said radiator comprising alternating strips of high and low infrared emissivity, arrayed in the direction of increasing fluid levels, and an infrared detector constructed and disposed to measure the intensity of infrared energy radiated by each of said strips.

5. Liquid level measuring apparatus comprising, in combination, a liquid container, an infrared radiator disposed on the external surface of said container, said radiator comprising portions having discretely varying infrared emissivities, said portions being positioned at different liquid levels, an infrared detector remote from said container, drive means connected to said detector to orient said detector to receive successively the infrared energy radiated by each of said radiator portions.

6. The combination defined in claim 5 including indicating means constructed to correlate the intensity of the infrared energy radiated from each portion with the position of said portion on said container, whereby the portion adjacent said liquid level is identified.

7. Apparatus for measuring the level of a liquid in an exposed container comprising, in combination, a vertical sequence of alternately high and low infrared emissivity strips disposed on the exterior surface of said container, an infrared detector horizontally removed from said container to successively scan said strips and sense the infrared energy radiated by each of said strips, and a recorder connected to operate in synchronism with the scanning of said detector from strip to strip and recording the levels of infrared energy sensed by said detector.

References Cited in the file of this patent

UNITED STATES PATENTS 2,423,885    Hammond              July 15, 1947

FOREIGN PATENTS 892,118    France                Jan. 3, 1944